(12) United States Patent
Boi et al.

(10) Patent No.: US 10,746,062 B2
(45) Date of Patent: Aug. 18, 2020

(54) GASKET WITH AN IMPROVED HEAT DISSIPATION CAPACITY FOR A VALVE OF AN INTERNAL COMBUSTION ENGINE

(71) Applicant: Freudenberg Sealing Technologies S.A.S. Di Externa Italia S.R.L.U., Pinerolo (TO) (IT)

(72) Inventors: Alessandro Boi, Pinerolo (IT); Wojciech Kokoszynski, Pinerolo (IT); Kira Sophie Truxius, Pinerolo (IT); Volker Schroiff, Pinerolo (IT); Martin Gramlich, Pinerolo (IT); Patrick Martini, Pinerolo (IT); Christoph Klingshirn, Pinerolo (IT)

(73) Assignee: Freudenberg Sealing Technologies S.A.S. Di Externa Italia S.R.L.U. (IT)

( * ) Notice: Subject to any disclaimer, the term of this patent is extended or adjusted under 35 U.S.C. 154(b) by 0 days.

(21) Appl. No.: 16/232,453

(22) Filed: Dec. 26, 2018

(65) Prior Publication Data

US 2019/0309662 A1 Oct. 10, 2019

(30) Foreign Application Priority Data

Apr. 4, 2018 (IT) .......................... 102018000004203

(51) Int. Cl.
*F01L 3/08* (2006.01)
*F01L 3/12* (2006.01)
(Continued)

(52) U.S. Cl.
CPC .................. *F01L 3/08* (2013.01); *F01L 3/02* (2013.01); *F01L 3/12* (2013.01); *F16J 15/3268* (2013.01); *F16K 41/04* (2013.01); *F01L 2810/02* (2013.01)

(58) Field of Classification Search
CPC ...... F01L 3/08; F01L 3/085; F01L 3/12; F01L 3/02; F01L 3/22; F01L 2810/02; F02F 11/00; F16K 41/04; F16J 15/3268
See application file for complete search history.

(56) References Cited

U.S. PATENT DOCUMENTS 3,699,942 A * 10/1972 Moray ...................... F01L 3/08
123/188.6
3,892,210 A * 7/1975 Kuhn ........................ F01L 1/32
123/90.3
(Continued)

FOREIGN PATENT DOCUMENTS

EP 3236117 A1 10/2017

OTHER PUBLICATIONS

Italian Search Report for related application No. 201800004203 dated Dec. 13, 2018.

*Primary Examiner* — Grant Moubry
(74) *Attorney, Agent, or Firm* — The Belles Group, P.C.

(57) ABSTRACT

It is described a gasket for a valve of an internal combustion engine having a central axis and comprising: an elastically deformable sealing element having an annular shape with respect to the aforesaid axis and adapted to be externally arranged on the valve, and a support element, also having an annular shape with respect to the aforesaid axis, coaxially arranged on at least part of the sealing element so that this latter is radially pressed between the support element and the valve; the support element having, along its side wall, at least one through window to allow the evacuation of the heat generated in use during the operation of the valve.

13 Claims, 4 Drawing Sheets

(51) Int. Cl.
*F01L 3/02* (2006.01)
*F16K 41/04* (2006.01)
*F16J 15/3268* (2016.01)

(56) References Cited

U.S. PATENT DOCUMENTS

| | | | | |
|---|---|---|---|---|
| 4,200,066 | A * | 4/1980 | Berchtold | F01L 3/085 |
| | | | | 123/188.8 |
| 4,947,811 | A * | 8/1990 | Binford | F01L 3/08 |
| | | | | 123/188.6 |
| 5,775,284 | A * | 7/1998 | Kirchner | F01L 3/08 |
| | | | | 123/188.6 |
| RE40,764 | E * | 6/2009 | Butcher | F01L 3/08 |
| | | | | 123/188.6 |
| 9,416,690 | B2 * | 8/2016 | London | F01L 3/08 |
| 9,500,106 | B2 * | 11/2016 | Pawl | F01L 3/08 |
| 10,167,748 | B2 * | 1/2019 | Kokoszynski | F16J 15/3268 |
| 2003/0146580 | A1 * | 8/2003 | Hegemier | F01L 3/08 |
| | | | | 277/502 |
| 2004/0104537 | A1 * | 6/2004 | McArthy | F01L 3/08 |
| | | | | 277/502 |
| 2005/0040603 | A1 * | 2/2005 | Leimer | F01L 3/08 |
| | | | | 277/502 |
| 2008/0157480 | A1 * | 7/2008 | Scarano | F01L 3/08 |
| | | | | 277/402 |
| 2011/0024666 | A1 * | 2/2011 | London | F01L 3/08 |
| | | | | 251/366 |
| 2013/0015625 | A1 * | 1/2013 | Hegemier | F16J 15/3224 |
| | | | | 277/502 |
| 2015/0123352 | A1 * | 5/2015 | Zoppi | F01L 3/08 |
| | | | | 277/591 |
| 2015/0167850 | A1 * | 6/2015 | Zoppi | F16K 1/46 |
| | | | | 251/214 |

* cited by examiner

GASKET WITH AN IMPROVED HEAT DISSIPATION CAPACITY FOR A VALVE OF AN INTERNAL COMBUSTION ENGINE

CROSS-REFERENCE TO RELATED PATENT APPLICATIONS

The present application claims priority to Italian Patent Application No. 102018000004203, filed Apr. 4, 2018. The disclosure of the aforementioned priority application is incorporated herein by reference in its entirety.

TECHNICAL FIELD

The present invention relates to a gasket for a valve of an internal combustion engine.

BACKGROUND OF THE INVENTION

Known internal combustion engines for vehicles comprise a head bearing one or more cylinders, inside which the engine cycle is carried out, and which communicate with respective combustion chambers of the engine. On the aforesaid head there are also provided suitable seats for connecting the combustion chamber with ducts suitable for supplying said chamber with a mixture of unburnt fuel and air ("intake ducts") and for removing the combusted gases from said combustion chamber ("exhaust ducts").

The flows from and towards each combustion chamber are controlled by suitable valves acting on the aforesaid seats. In particular, each valve essentially comprises a guide element, fixed inside a cavity of the head of the engine and defining a through seat, and a stem, slidingly movable in opposite directions within the aforesaid seat and carrying at one end a shuttering element to close the connection between the relative intake or exhaust duct and the corresponding combustion chamber.

The opposite end of the valve stem axially projects from the respective guide element and receives actuating forces from a relative control device, for example a cam shaft.

The valve stem is axially loaded by a helical spring in the closing direction of the connection between the respective intake or exhaust duct and the corresponding combustion chamber.

In particular, the spring is coaxially mounted about the valve and is axially interposed between a stationary surface formed on the head of the engine and a plate fastened to the valve stem, near or at the end of the stem cooperating with the control device.

The valves of the aforesaid type normally have sealing gaskets for the lubricating oil normally circulating in the engines. Said gaskets, in one of the most commonly known forms, comprise a support or reinforcement member, having a substantially tubular shape and made of a single piece of metal material, and an annular sealing element, made of elastomeric material and interposed between the support element and the valve.

In particular, the sealing element typically comprises a first portion cooperating through its own radially inner annular surface with the radially outer annular surface of the portion of the guide element oriented in use towards the aforesaid control device, and a second portion directly cooperating with the valve stem.

The gaskets of the aforesaid type are widely used on all internal combustion engines to control the amount of lubricating oil flowing from the distribution area to the combustion chambers. An excessive flow of lubricating oil causes, besides an obviously high oil consumption, a deterioration of the efficiency of the engine and a reduction in the performance of the catalyst of the vehicle. On the other hand, an insufficient flow causes increased wear and noise of the valves together with local temperature peaks. These phenomena can cause a premature damage to the valves due to the seizure of the valve stem inside the guide element.

Thanks to the first portion of the sealing element acting on the guide element of the relative valve, the known sealing gaskets allow a static type seal, and thanks to the second portion of the sealing element cooperating with the stem, a dynamic type seal. In particular, the static seal must ensure a certain degree of radial compression on the guide element in order to avoid the leakage of lubricating oil towards the combustion chambers and at the same time keep the gasket in position, while the dynamic seal is designed for allowing the minimum flow of oil necessary for the lubrication of the coupling between the stem and the guide element.

The support element includes:
- a main portion substantially shaped like a cylindrical sleeve cooperating along its entire axial height with the sealing element;
- a first annular flange extending radially inwardly from an axial end of the main portion and partly embedded in an annular seat of the sealing element; and
- a second annular flange extending radially outwardly from an opposite axial end of the main portion and suitable to be pushed against the aforesaid stationary surface of the head of the motor by the spring acting on the valve stem. The second annular flange of the support element defines an abutment surface for an axial end of the spring and receives from this latter the normal operating loads.

The second annular flange also allows the gasket to be actuated in the desired position on the valve.

An example of an aforesaid type of gasket is disclosed in the Italian patent for utility model no. 0000281466.

The disclosed solution, although functionally valid, is susceptible of further improvements, in particular as regards the evacuation of the heat generated inside the gasket during the valve operation.

SUMMARY OF THE INVENTION

The object of the present invention is therefore to provide a gasket for a valve of an internal combustion engine, which allows filling the aforesaid need in a simple and inexpensive way.

The aforesaid object is achieved by the present invention, in that it relates to a gasket for a valve of an internal combustion engine according to what is defined in claim 1.

BRIEF DESCRIPTION OF THE DRAWINGS

For a better understanding of the present invention, a preferred embodiment is described hereinafter purely as a non-limiting example and with reference to the attached drawings, in which.

DETAILED DESCRIPTION OF THE INVENTION

Figure 1:
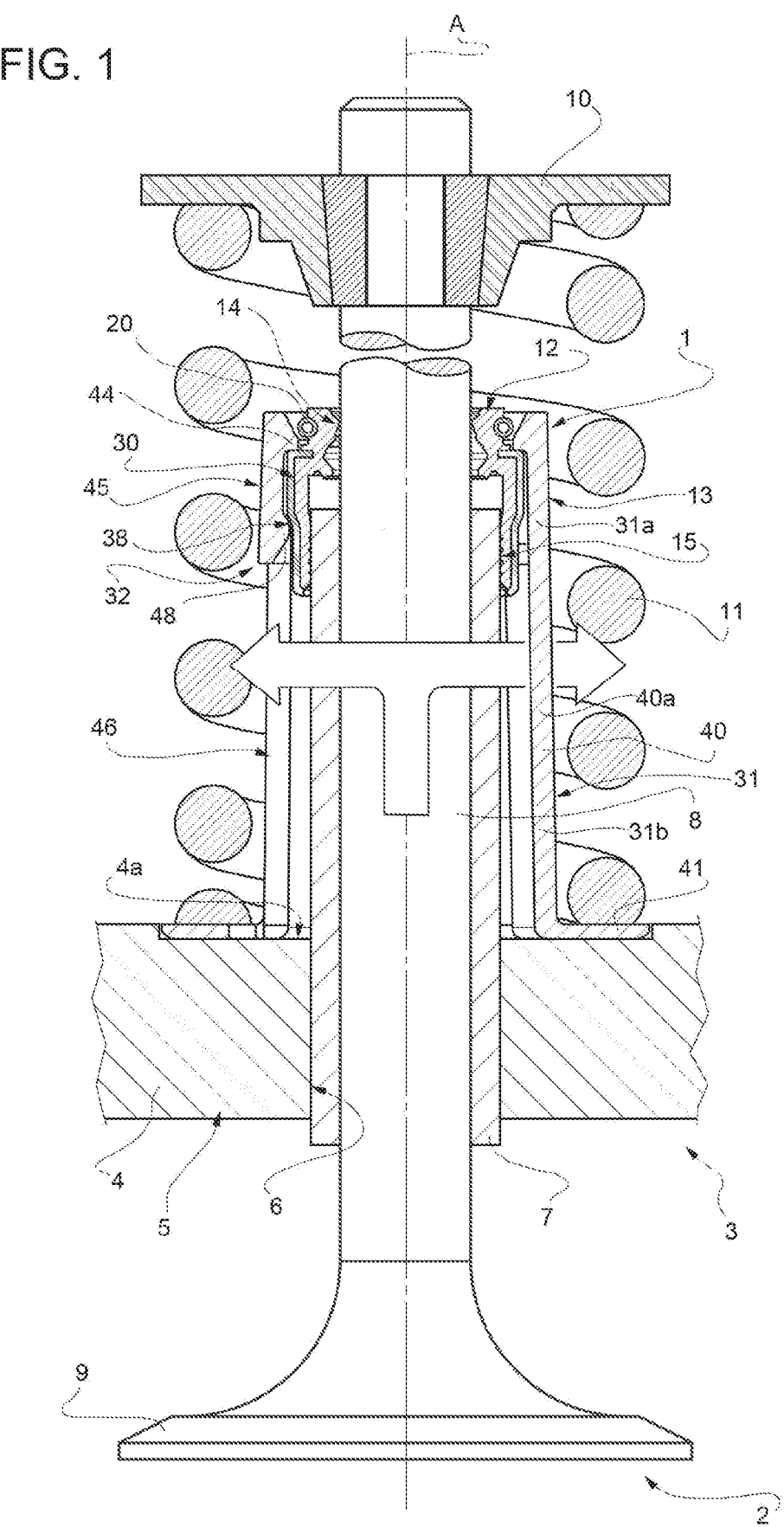
FIG. 1 shows an axial sectional view of a gasket made according to the present invention and mounted on a valve of an internal combustion engine.
Figure 2:
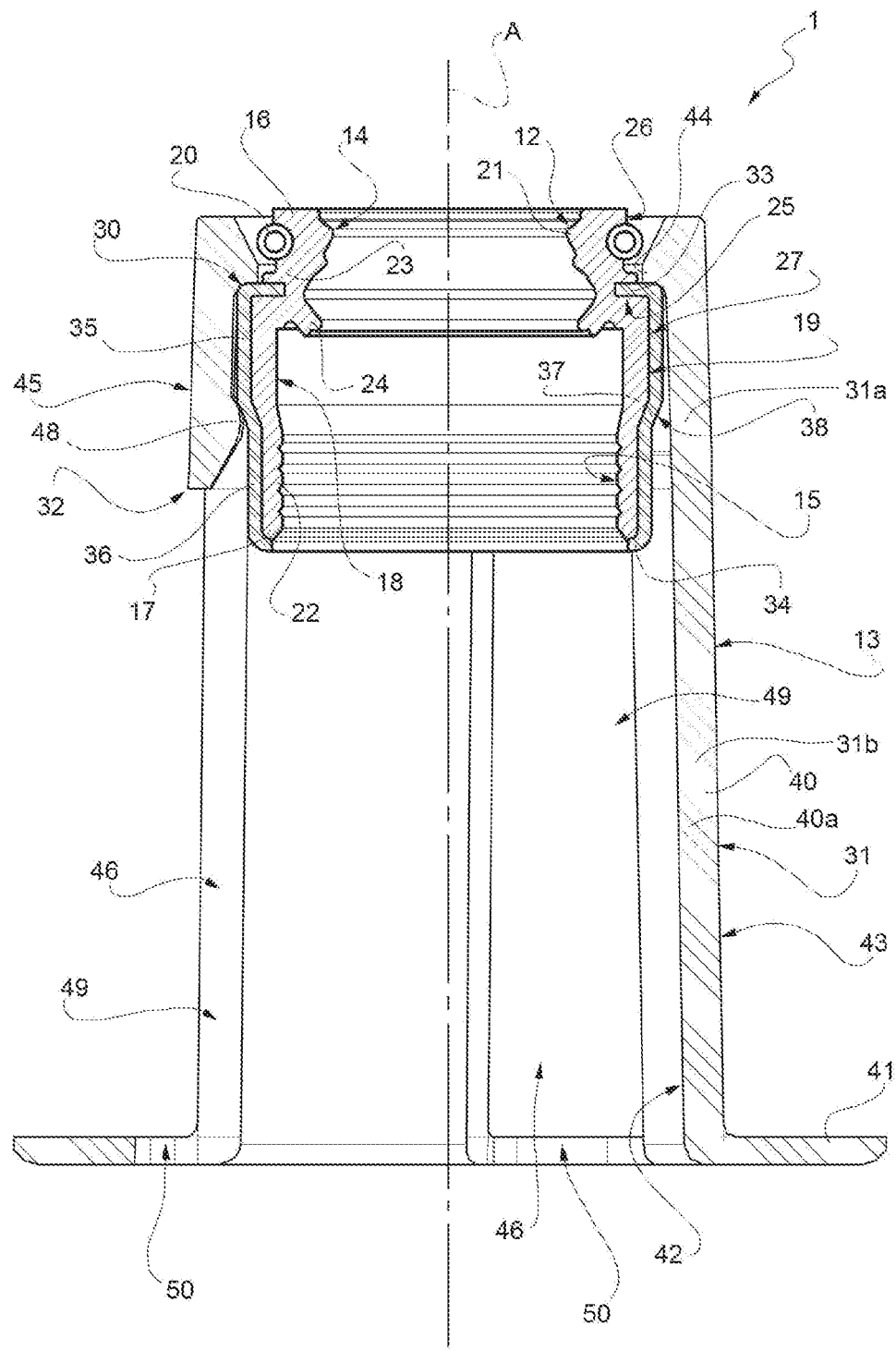
FIG. 2 shows the gasket of FIG. 1 in an axial section and on an enlarged scale.

With reference to FIGS. 1 and 2, 1 indicates as a whole a seal according to the present invention for a valve 2 of an internal combustion engine 3, known per se and shown in FIG. 1 only to the extent necessary for understanding the present invention.

In more detail, FIG. 1 shows the engine 3 only with regard to a portion 4 of a head 5, which defines in a known manner a combustion chamber (not visible in FIG. 1 but arranged below the shown portion 4 of the head 5), inside which a fuel is oxidized in the presence of combustion air in order to transform the chemical energy contained in the fuel into pressure energy.

The combustion chamber receives in a known way, through an opening thereof, a mixture comprising the fuel and the combustion air and discharges, through another opening, the gas and the air burnt at the end of the combustion process. The flows from and towards the combustion chamber are controlled by respective valves 2 of the aforesaid type, acting on said openings of the combustion chamber.

The following description will refer for simplicity's sake to a single valve 2. It is however clear that every valve of this type used in the engine 3 has the same described characteristics.

With reference to FIG. 1, the valve 2 is housed in a through seat 6 having an axis A, which is formed in the portion 4 of the head 5 and normally contains lubricating oil.

The valve 2 comprises a tubular guide element 7 fitted by interference within the seat 6, and a sliding stem 8 movable in opposite directions along the axis A within the guide element 7.

In more detail, the stem 8 axially projects from opposite sides of the guide element 7 and is provided at its opposite axial ends respectively with a shuttering element 9, engaging in fluid-tight manner the relative opening in the chamber of combustion, and with an actuating element or plate 10 receiving actuating forces from a control mechanism, in itself known and not shown, for example a cam shaft.

A gasket 1 according to the invention, coaxially surrounding both the guide element 7 and the stem 8, is externally fitted on the axial end portion of the guide element 7, from which the end of the stem 8 provided with the plate 10 projects.

The valve 2 further comprises a spring 11, in the shown case of a helical type, which cooperates at its own opposite axial ends with the plate 10 and with a part of the gasket 1 (described in greater detail in the following), which is axially pressed against an annular stationary surface 4a of the portion 4 of the head 5 having an axis A.

The spring 11 generates an elastic return force on the stem 8 to keep it always in contact with the control mechanism at the plate 10.

With reference to FIGS. 1 and 2, the gasket 1 has an annular shape with respect to an axis coinciding with the axis A in assembly conditions.

More specifically, the gasket 1 essentially comprises a sealing element 12 having an annular shape and made of elastomeric material and a support element 13 coaxially arranged on the sealing element 12 for pressing this latter in a radial direction with respect to the axis A on the guide element 7 and on the stem 8 of the valve 2. The sealing element 12 is coaxially interposed between the support element 13 and the valve 2.

First, proceeding along the axis A towards the shuttering element 9 of the stem 8, the sealing element 12 defines a dynamic type seal 14 allowing the passage of a minimum oil flow necessary for the lubrication of the coupling between the stem 8 and the guide element 7, and then a static type seal 15 to prevent the oil flow towards the combustion chamber.

In more detail (FIG. 2), the sealing element 12 is delimited by two opposite annular disc-shaped sections 16, 17 having an axial end, by an inner circumferential surface 18, partially cooperating with the stem 8 and partially cooperating with the guide element 7 to make the seals 14 and 15, and by an outer circumferential surface 19 mating with the support element 13 and with an elastic annular collar 20 so as to press the inner circumferential surface 18 on the stem 8.

The section 16, under assembly conditions, is oriented towards the plate 10 and is crossed by the rod 8; the section 17, under assembly conditions, is oriented towards the combustion chamber and is in contact with the guide element 7 in which the stem 8 slides.

The inner circumferential surface 18 of the sealing element 12 comprises, in a position adjacent to the section 16, a section 21 having a minimum diameter, to be pressed radially by the elastic collar 20 against the stem 8 to define a dynamic type circumferential sealing line (seal 14), which allows a minimum escape of the oil flow thanks to the sliding coupling with the stem 8.

The inner circumferential surface 18 of the sealing element 12 further comprises, in a position adjacent to the section 17, a substantially cylindrical portion 22 with small undulations to be radially pressed by the support element 13 against the guide element 7 to define a static type cylindrical sealing area (seal 15).

The inner circumferential surface 18 of the sealing element 12 further comprises, in an interposed position between the section 21 and the portion 22, a further portion 23 cantileverly carrying a gas sealing lip 24 cooperating with the stem 8 of the valve 2.

The lip 24 has a substantially frustoconical shape having an axis A with a section decreasing in the opposite direction with respect to the pressure forces generated in use by the gases directed towards the section 21. In the shown case, the lip 24 has a decreasing cross-section towards the portion 22.

As shown in FIGS. 1 and 2, the lip 24 is connected to the portion 23 of the inner circumferential surface 18 of the sealing element 12 at its portion with a larger section. This connection defines a kind of virtual hinge between the lip 24 and the inner circumferential surface 18 of the sealing element 12.

The outer circumferential surface 19 of the sealing element 12 defines, in an axially interposed position between the section 21 and the portion 23 of the inner circumferential surface 18, a recess 25, whose function will be explained below. The recess 25 divides the outer circumferential surface 19 into a portion 26 for housing the elastic collar 20, extending towards the section 16, and into an elongated portion 27 extending towards the section 17 and suitable to be coupled with the support element 13 together with the recess 25.

With reference to FIGS. 1 to 4, the support element 13 is preferably formed by two distinct annular components 30, 31, coaxially mounted by means of snap coupling means 32. In particular, the radially innermost component 30 cooperates in use with the sealing element 12 to press it radially on the guide element 7 of the valve 2, while the component 31 is mounted in a radially outermost position on the component 30 and is positioned in use on the stationary surface 4a of the portion 4 of the head 5 of the engine 3 by means of the spring 11 of the valve 2.

The component 30 defines an interaction portion of the support element 13 with the sealing element 12, while the component 31 defines a positioning portion of the support element 13 on the portion 4 of the head 5 of the engine 3 and with respect to the guide element 7 of the valve 2. The component 31 receives operating loads from the spring 11 of the valve 2 and brings the gasket 1 into the desired position on the valve 2.

In use, both the components 30, 31 are mounted so as to externally surround the assembly formed by the guide element 7 and by the stem 8 of the valve 2.

With particular reference to FIG. 2, the component 30 is preferably made of metal material and consists of an approximately cylindrical bushing elongated along the axis A. In particular, the component 30 cooperates with the portion 27 of the outer circumferential surface 19 of the sealing element 12 and essentially comprises:
- a first annular disc-shaped end portion 33, extending in a radial direction with respect to the axis A, partially embedded in use in the recess 25 of the sealing element 12 and from which the portion 24 of the outer circumferential surface 19 of the element of seal 12 projects;
- a second opposite end portion 34, slightly bent towards the axis A so as to axially retain the sealing element 12 at the section 17 of this latter;
- a first cylindrical portion 35, cantileverly extending from an outer radial end of the end portion 33 towards the end portion 34; and
- a second cylindrical portion 36 extending from the end portion 34, whose outer and inner diameters are smaller than the outer and inner diameters of the cylindrical portion 35 and are connected to this latter by a tapered connecting section 37.

The component 30 has increasing radial dimensions with respect to the axis A, proceeding from its end portion 34 and then radially bending inside the recess 25 of the sealing element 12 at the opposite end portion 33.

The tapered connecting section 37 defines, on the opposite side with respect to the side cooperating with the sealing element 12, an annular shoulder 38, whose function will be explained below.

Figure 3:
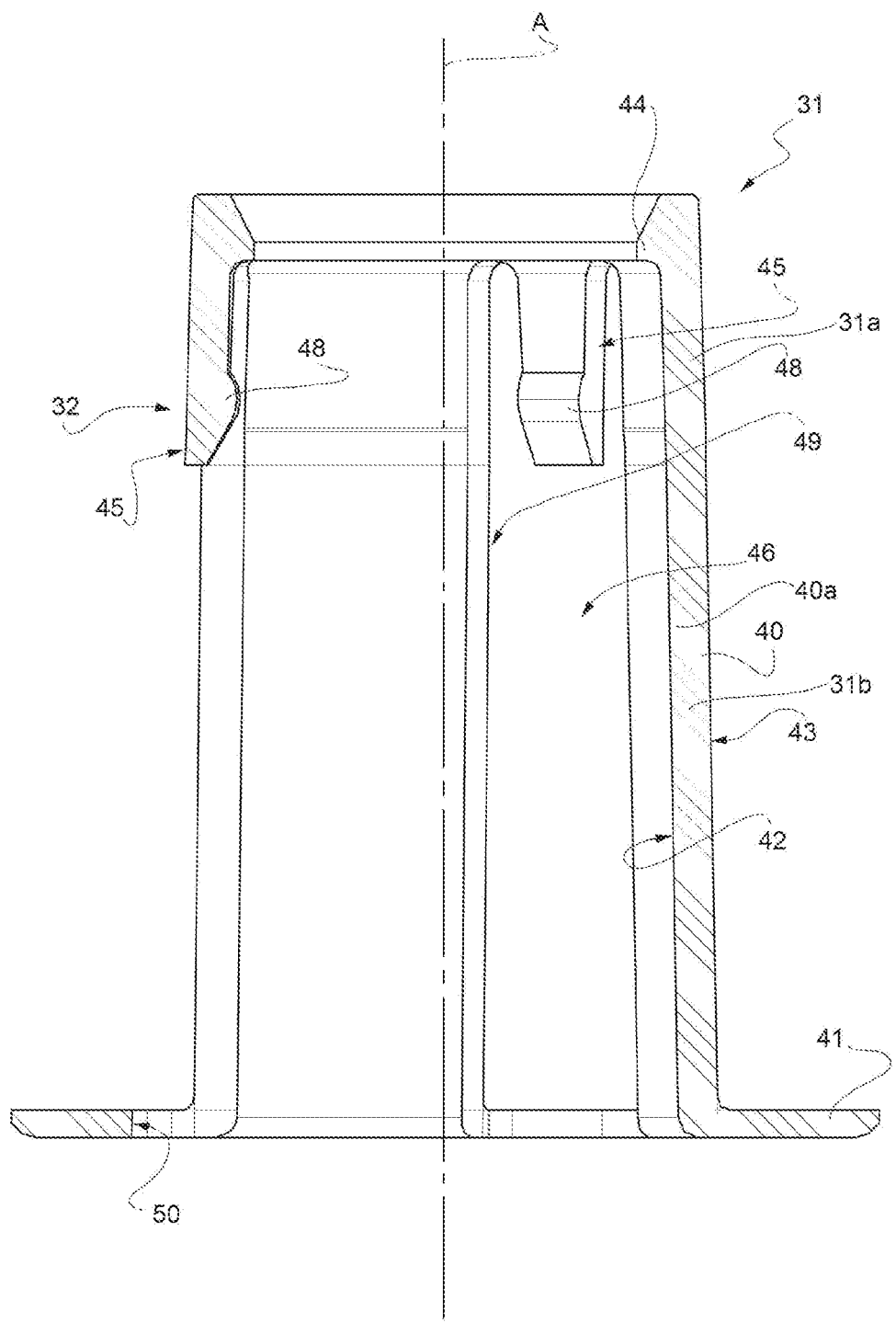
FIG. 3 shows an axial sectional view of a component of the gasket of FIG. 2.
Figure 4:
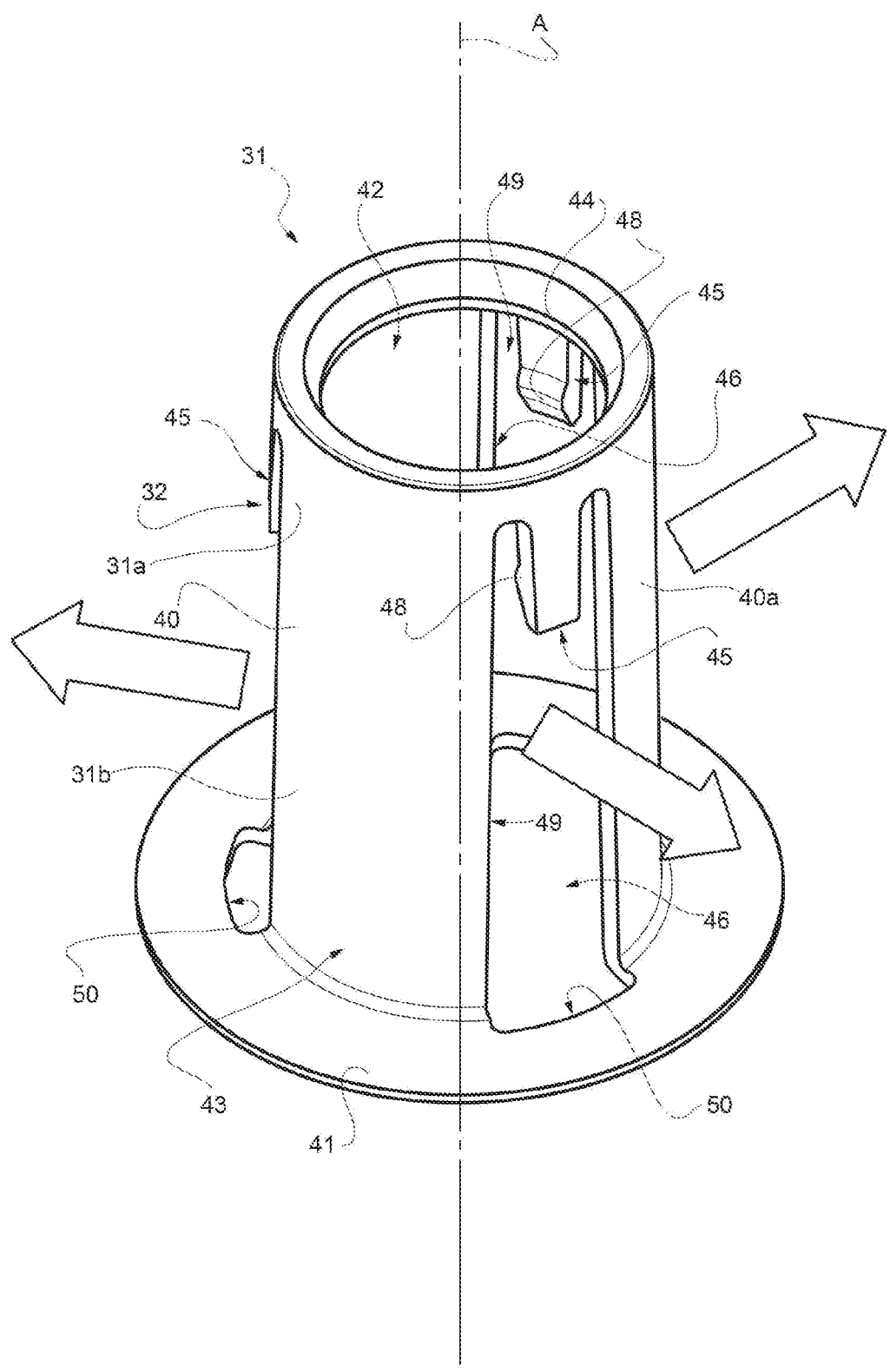
FIG. 4 shows a perspective view of the component of FIG. 3.

With reference to FIGS. 2, 3 and 4, the component 31 is made of plastic material. Preferably, the component 31 can be made of a high performance thermoplastic material with excellent mechanical and thermal resistance properties, capable of replacing the functions of metal materials in static and dynamic applications. The thermoplastic material constituting the component 31 may or may not be reinforced with suitable agents, for example of an organic or inorganic type.

The component 31 integrally comprises an annular main body 40, in the shown case slightly frustoconical, having an axis A, surrounding the component 30, and a flat annular end flange 41, radially projecting outwardly from the main body 40 and abuttingly cooperating against the stationary surface 4a of the portion 4 of the head 5 of the engine 3 under the axial thrust of the spring 11 of the valve 2. According to a possible alternative not shown, the main body 40 could also have a cylindrical shape having an axis A.

The component 31 has an extension along the axis A greater than the one of the component 30. In fact, the component 30 interacts only with an end portion of the component 31 opposite the flange 41.

In particular, the main body 40 has a frustoconical or cylindrical side wall 40a delimited by a radially inner surface 42, oriented towards the axis A, and by a radially outer surface 43, opposite the surface 42 and from which the flange 41 radially projects outwardly.

The component 31, and more precisely the main body 40, has a first annular portion 31a, radially superimposed on the component 30, and a second annular portion 31b, which axially projects from the component 30 and is radially free with respect to this latter, since it does not interact with the 30 component.

Advantageously, the side wall 40a of the main body 40 has one or more through windows 46, in the shown case three, to allow the evacuation of the heat from the gasket 1 during the operation of the valve 2.

Preferably, the windows 46 are angularly equidistant about the axis A.

In particular, each window 46 extends mostly along the portion 31b of the main body 40 of the component 31 in order to allow an effective disposal of the heat generated in use.

The main body 40 further has an annular edge 44, axially spaced from the flange 41 and radially projecting towards the axis A and defining an axial abutment for the end portion 33 of the component 30.

The snap coupling means 32 comprise two or more hooking projections 45, three in the shown case, angularly equidistant about the axis A, cantileverly extending from the annular edge 44 towards the flange 41 inside respective through windows 46 of the main body 40 and cooperating in contact with the component 30 to abuttingly keep it against the annular edge 44.

In the example shown in the accompanying figures, the annular edge 44 defines an end portion of the main body 40 axially opposite the flange 41.

The hooking projections 45 are integral with the main body 40 and have, at their free ends, respective retaining teeth projecting towards the axis A and configured to abuttingly cooperate against the outer annular shoulder 38 of the component 30.

The hooking projections 45 extend, in an undeformed position, substantially parallel to the axis A (FIGS. 2 to 4) and are elastically flexible from and towards the component 30 to snap couple with the annular shoulder 38 of this latter.

Each window 46 is delimited on one side by the annular edge and on the opposite side by the flange 41. More precisely, each window 46 has a first portion 49 extending along the main body 40 substantially for the whole axial height thereof, and a second portion 50, of reduced size, extending along part of the radial depth of the flange 41. By considering the characteristics of the gasket 1 made according to the dictates of the present invention, the advantages it allows obtaining are evident.

In particular, thanks to the presence of the windows 46, it allows obtaining in use an effective disposal/dissipation of the heat generated during the operation of the valve 2. Finally, it is clear that the gasket 1 here described and illustrated may be subject to modifications and variations that do not come out of the scope of protection defined by the appended claims.

In particular, also the component 30 could be made of plastic material.

Moreover, the support element 13 could be integrally constituted by a single annular body provided with one or more through windows along its side wall.

The invention claimed is:

1. A gasket for a valve of an internal combustion engine; said valve comprising a guide element defining a through seat, and a movable stem sliding in said seat; said gasket having a central axis and comprising:
   an elastically deformable sealing element, having an annular shape with respect to said axis (A) and adapted to be externally arranged on said valve to cooperate both with said guide element and with said stem; and
   a support element having an annular shape with respect to said axis (A), coaxially arranged on at least part of said sealing element so that said sealing element is radially pressed between said support element and said valve;
   said support element comprising a first annular component, internally cooperating with at least one portion of said sealing element, and a second annular component, distinct and separate from said first annular component, coupled to said first annular component, mounted coaxially and in a radially outermost position on said first annular component and configured to arrange in use said gasket on said engine; an extension of said second annular component along said axis (A) being greater than an extension of said first annular component; said second annular component having a first annular portion radially superimposed on said first annular component and a second annular portion axially projecting from said first annular component and radially free with respect to the first annular component;
   wherein said second annular component has, along its side wall, at least one through window to allow the evacuation of the heat generated in use during the operation of the valve; and
   wherein said window extends at least partly along said second annular portion of said second annular component.

2. The gasket according to claim 1, wherein said second component comprises:
   a substantially cylindrical or frustoconical main body surrounding said first component and defining said first and second annular portions; and
   an annular flange projecting radially outwardly from one axial end of said second portion of said main body and adapted to be mounted in a fixed position with respect to said valve.

3. The gasket according to claim 2, wherein said main body has, on the axially opposite side of said flange, an annular end edge.

4. The gasket according to claim 3, wherein said window is axially delimited on one side by said flange and on the opposite side by said annular edge.

5. The gasket according to claim 1, wherein said support element has a plurality of said through windows, angularly equidistant about said axis (A).

6. The gasket according to claim 1, wherein said first component is made of metal material.

7. The gasket according to claim 1, wherein said second component is made of plastic material.

8. A gasket for a valve of an internal combustion engine, comprising:
   an elastically deformable sealing element having an annular shape with respect to said axis (A) and adapted to be externally arranged on said valve to cooperate with said guide element and with said stem; and
   a support element having an annular shape with respect to said axis (A), coaxially arranged on at least part of said sealing element so that said sealing element is radially pressed between said support element and said valve;
   said support element comprising a first annular component, internally cooperating with at least one portion of said sealing element, and a second annular component, distinct and separate from said first annular component, coupled to said first annular component, mounted in a radially outermost position on said first annular component;
   wherein said second annular component has, along its side wall, at least one through window to allow the evacuation of the heat generated in use during the operation of the valve.

9. The gasket according to claim 8, wherein said second component comprises:
   a substantially cylindrical or frustoconical main body surrounding said first component and defining said first and second annular portions; and
   an annular flange projecting radially outwardly from one axial end of said second portion of said main body and adapted to be mounted in a fixed position with respect to said valve.

10. The gasket according to claim 9, wherein said main body has, on the axially opposite side of said flange, an annular end edge.

11. The gasket according to claim 10, wherein said window is axially delimited on one side by said flange and on the opposite side by said annular edge.

12. The gasket according to claim 8, wherein said first component is made of metal material.

13. The gasket according to claim 8, wherein said second component is made of plastic material.

* * * * *